(Model.)

M. J. PALSON.
FISH DRESSING MACHINE.

No. 249,663.

Patented Nov. 15, 1881.

WITNESSES:
Chas. Nida
C. Sedgwick

INVENTOR:
M. J. Palson
BY Munn & Co.
ATTORNEYS.

N. PETERS, Photo-Lithographer, Washington, D. C.

UNITED STATES PATENT OFFICE.

MAGNUS J. PALSON, OF ELIZABETH, NEW JERSEY, ASSIGNOR TO HIMSELF AND WILLIAM WHITMAN, OF SAME PLACE.

FISH-DRESSING MACHINE.

SPECIFICATION forming part of Letters Patent No. 249,663, dated November 15, 1881.

Application filed December 14, 1880. (Model.)

*To all whom it may concern:*

Be it known that I, MAGNUS J. PALSON, of Elizabeth, in the county of Union and State of New Jersey, have invented a new and Improved Machine for Dressing Fish, of which the following is a full, clear, and exact description.

The object of my invention is to provide a new and improved machine for dressing fish—that is, to remove the head, entrails, and backbone—thus preparing the fish for salting and packing it for shipment.

The invention consists in a machine provided with a jointed reciprocating plate, upon which the fish is placed, and is held firmly by spring-clamps, which are opened automatically to receive the fish by a beveled fork, a heart-plate, and two fixed converging bars, between which the head of the fish is held, so that it can be cut off by an automatically-released spring-knife, that is drawn upward by a chain attached to a pulley on the main driving-shaft of the machine, this shaft being provided with two cranks extending in directly-opposite directions, one of these cranks being connected by a suitable connecting-rod with the sliding plate for receiving the fish, whereas the other opposite crank is connected in a like manner with a reciprocating frame sliding above and in opposite direction to the fish-holding plate, which upper sliding frame is provided with knives and scoops, that adjust themselves automatically, according to the size of the fish, and rip open its belly, tear out the entrails and backbone, and cut the latter off at half its length, and also tear out the liver and throw it into a chute. The fish is seized by a hook attached to a sliding plate connected with the upper sliding knife-frame by a suitable connecting-rod, which hook pulls the fish out from between the spring-clamps upon an inclined chute, down which it slides, whereas the plate for receiving the fish returns to receive another fish.

The invention further consists in a hook-knife on the end of a rod pivoted to the lower end of the upper sliding or knife frame, and connected with the outer end of a lever, the inner end of which is connected with the inner end of a lever that operates the scoop-knives for cutting out the entrails and backbone, the outer end of this second lever being provided with a pin or stud that passes into one of a series of longitudinal guide-slots on the side of the frame of the machine, according to the thickness of the fish, for the end of the hook-knife drops by its own weight, and will always adjust itself to cut into the fish as soon as it meets the same, and thus also adjusts the pin on the outer end of the above-mentioned lever, and the position of the scoop-knife, &c., according to the thickness of the fish.

The invention further consists in a small circular saw mounted at the front edge of the scoop-knife and operated by means of belts from a pulley mounted on the same shaft with a geared wheel, which takes in the teeth of a rack on the side of the frame of the machine, thus causing the circular-saw pulley to revolve when the upper sliding or knife frame is in motion. By means of intermediate gearing the shaft of this pulley also operates a small reciprocating knife at the end of the bar to which the hook-knife is attached.

The invention also consists in a spring drop-knife for cutting through the backbone of the fish, which knife is seized and raised by a rack acted upon by a pinion of the pulley-shaft of the knife-frame, the knife being locked in the raised position by a stud on the end of a lever pivoted flat on the top of the knife-frame. The longitudinal guide-slots previously mentioned are provided with a transverse bar passing over the middle of all of them, and the stud at the end of the lever for regulating the hook-knife and scoop-knife also passes through the outer end of the lever that locks the drop-knife, and as soon as this stud strikes the transverse bar of the slots the front end of the lever holding the drop-knife is thrown outward and the spring forces the drop-knife downward, thereby cutting the backbone of the fish through the middle.

In the accompanying drawings, Fig. 1$^a$ is a longitudinal sectional elevation.

Similar letters of reference indicate corresponding parts.

The entire machine rests in a frame, A, having a horizontally-grooved track, A', fastened to the inner side of each longitudinal wall of the frame, which track A' begins at the bottom of the front of the frame A and extends upward on an inclined line a short distance past the middle of the frame. A second like track, A$^2$, is fastened to the upper side of the track A', but begins at the rear of the frame in the height of the upper end of the track A', extends to the front until it meets this upper end of the track A', and then passes down along the same, but is bent upward and outward on a curved line at about the middle of the track A'.

Figure 1:
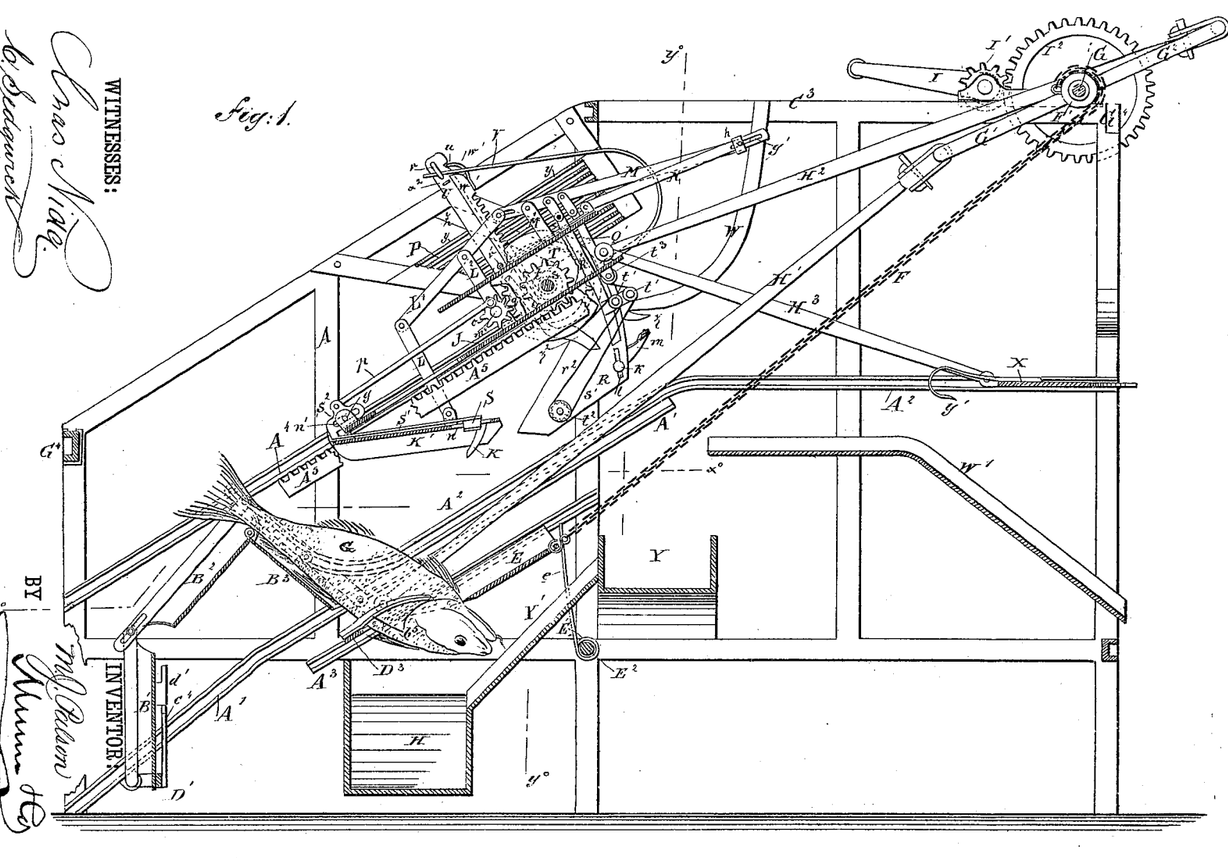
Figure 1 is a longitudinal sectional elevation of my improved machine for dressing fish.
Figure 4:
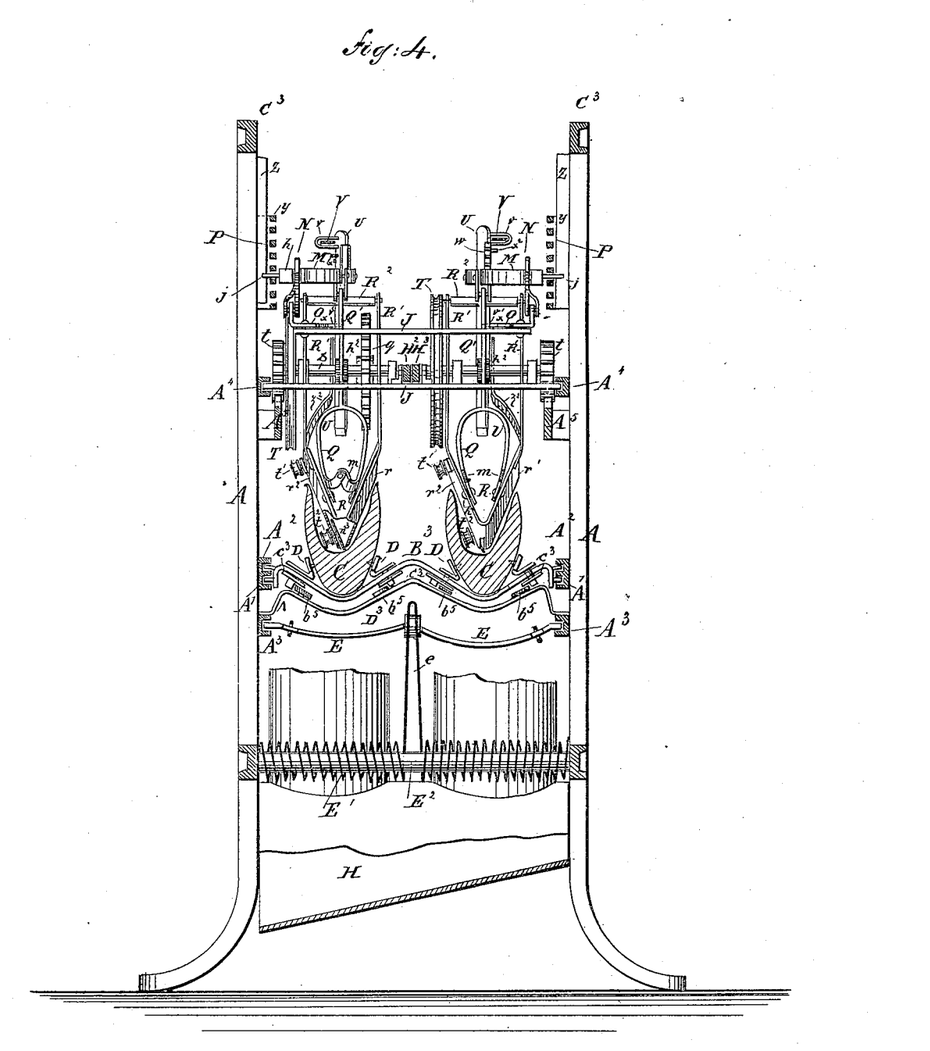
Fig. 4 is a cross-sectional elevation of the machine on the line $y^\circ y^\circ$, Fig. 1.
Figures 5, 6, 7, 8, 9:
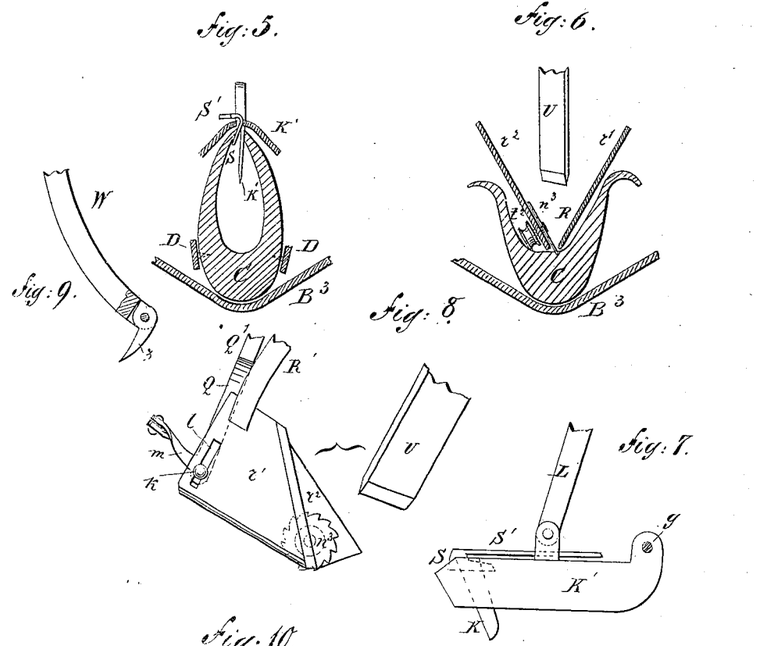
Fig. 5 is a cross-sectional elevation of the fish-receiving plate, the hook-knife, and the oscillating knife, showing the manner in which the fish is ripped open.
Fig. 6 is a cross-sectional elevation of the scoop-knife with the circular saw and the drop-knife above it.
Fig. 7 is a side elevation of the hook-knife and the oscillating knife.
Fig. 8 is a side elevation of the scoop-knife and the drop-knife.
Fig. 9 is a side elevation of the hook for drawing out the liver.
Figure 10:
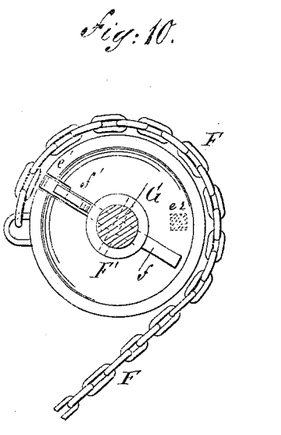
Fig. 10 is a side elevation of the automatical disengaging-pulley for the chains of the spring-knife for decapitating the fish.
Figure 11:
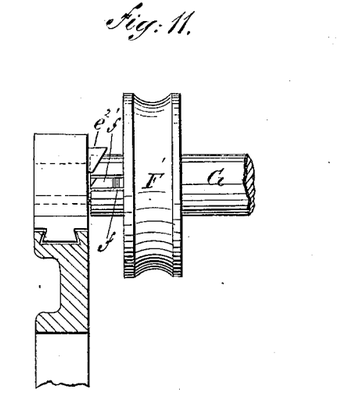
Fig. 11, a plan view of the same, showing the stud on the frame of the machine for releasing the pulley.

The plate B, for receiving the fish, is formed of three sections, B', B$^2$, and B$^3$, which are hinged to each other, and each of the longitudinal edges of the uppermost section is provided at the upper end with a guide-stud, $a^3$, which passes into the groove of the track A', and at the middle with a guide-stud, $b^3$, which passes into the groove of the track A$^2$. The middle section, B$^2$, is not provided with any guide-studs, but the lower section, B', is provided with a guide-stud, $a'$, at the lower end, which stud passes into the groove of the track A', and with a stud, $a^8$, which rests on the top of the track A', and prevents the upper end of the section B' from sagging. This plate B may be arranged for one or two fishes at the same time, a plate for two fishes being shown in this case, for which reason the plate B, composed of the hinged sections B', B$^2$, and B$^3$, is constructed with two longitudinal troughs or furrows, as shown in Fig. 4, to receive the fishes C C, which are placed into the troughs belly upward. According to the size of the fish, the same will occupy only one or all of the sections of the plate B. As the sections of the plate B are provided with guide-studs passing into the grooves of the tracks A' and A$^2$, it is evident that the sections will follow these tracks whenever motion is given to the plate B. The sections are provided with longitudinal clamps D, one on each side of each trough, which clamps are provided with studs $b'$ on the inner sides, and are forced toward each other by the springs $a^2$; but these clamps must be separated or opened before the fish can be placed into the trough. As the lower section, B', has a guide-stud, $a'$, passing into the groove of the track A' at the lower end, this end will pass to the lower end of the track A'; but as the upper end of the section B$^3$ is guided by a stud, $a^3$, which cannot leave the track A', it follows that the plate B will have to be folded or doubled up, as shown in Fig. 1, if the upper end is moved downward after its lower end has reached the lower end of the track A'. A bar, D', is pivoted to the under side of the track A', near the lower end of the same, and to this bar two forks, $c^4$, having the outer edge of their prongs beveled on a curved line toward the rear, are attached, the bar D' being pivoted in such a manner that the forks can swing upward toward the front of the frame, but cannot drop any lower than a position parallel with the track A'.

The clamps D D of the section B' are provided near the upper end with flanges, to which studs $c'$ $c'$ are attached, that pass through transverse slots $a^4$ in the section B' and project from the lower surface of this section. A flanged stud, $d'$, is attached to the lower surface of the section B', between the studs $c'$ $c'$, so that when the section B' slides down the lower part of the track A' the stud $d'$ will pass in between the prongs $d$ and guide these prongs, the beveled edges of which gradually press the studs $c'$ $c'$ outward, and thus separate the clamps D D of the section B'. As the bar D' is pivoted, the forks $c^4$ can follow the movements of the section B', as shown in Fig. 1. The clamps D D of the section B$^2$ are also provided with short flanges near the upper end, and from these flanges studs $c^2$ $c^2$ pass through the transverse slots $a^5$ and project from the lower surface of the section B$^2$.

A longitudinally-slotted heart-shaped plate, $c^5$, is pivoted to the lower end of section B$^3$, and a flanged stud, $d^2$, on the under side of the upper end of the section B$^2$, and between the studs $c^2$ $c^2$, passes through the slot of the heart-piece $c^5$, so that when the plate B is doubled up, as shown in Fig. 1, the heart-piece will be forced in between the studs $c^2$ $c^2$, and will force them apart, thereby separating the clamps D D of the section B$^2$.

Figure 2:
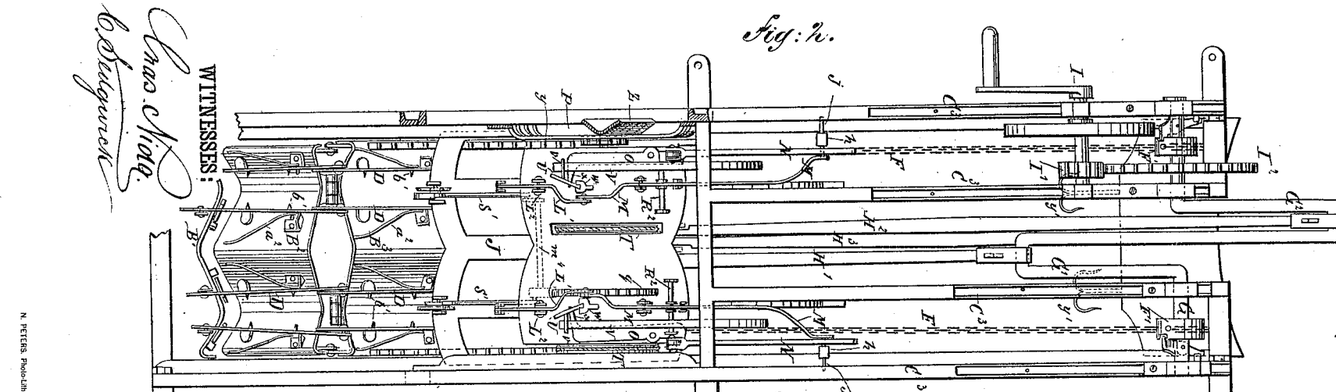
Fig. 2 is a plan view of the same.
Figure 3:
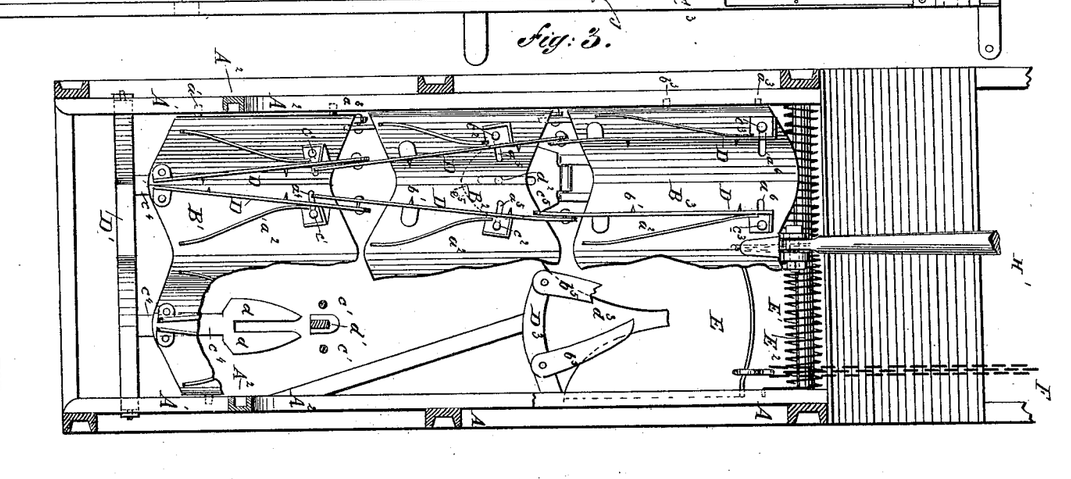
Fig. 3 is a plan view on the line $x^\circ$ $x^\circ$, Fig. 1, of the plate for receiving the fish, parts being broken out to show the spring-knife for decapitating the fish.

Flanges are attached to the upper ends of the clamps D of the section B$^3$, and studs or short guide-plates $c^3$ are attached to these flanges and pass through transverse slots $a^6$ in the upper ends of the section B$^3$. Two converging curved arms, $b^5$, which almost touch at the ends, are pivoted to a transverse bar, D$^3$, of the frame, below each trough of the plate B, these curved arms projecting upward in the direction of the tracks A' and A$^2$. The studs $c^3$ $c^3$ will rest against the outer edges of the curved arms $b^5$, and when the section B$^3$ descends these arms will force the studs $c^3$ apart, and will thus separate the clamps D of the section B³. When the plate B is doubled up into the position shown in Fig. 1, the clamps are separated, as shown in Figs. 2 and 3, and the fish are placed into the trough, as shown, the head being passed in between the arms $b^5$, which catch the gill-bones of the fish and prevent the fish from sliding down the inclined section B³ too far. The arms $b^5$ are pivoted in such a manner that they can spread and adjust themselves to the various sizes of the fishes' heads. During the ascent of the fish-receiving plate the studs $c^3$ press the curved arms $b^5$ together, so that they are closed ready to receive the head of the next fish.

A short horizontally-grooved track, A³, is fastened to the frame A below and parallel to each of the tracks A' and A², and extends from the curved part of the track A² to about the horizontal part of the track A'. A broad knife, E, with two longitudinal troughs or furrows corresponding in position to those of the fish-receiving plate B, slides in these tracks A³. This knife is provided at the lower end with two sharp-edged recesses, $d^3$, increasing in width toward the edge of the knife on convex lines. A strong spiral spring, E', is coiled around a shaft, E², of the frame A, and a projection, $e$, of this spring presses upon the upper edge of the knife E, as shown in Figs. 1 and 4.

Two chains or equivalents, F F, are fastened to the upper edge of the knife E, and the other ends of these chains are fastened each to a grooved pulley, F', loosely mounted on the main driving-shaft G of the machine, which shaft is located at the rear of the upper part of the machine. These pulleys F' are provided with a notch, $e'$, in the side near or at the periphery, and a lever, $f$, is pivoted on the shaft G next to each of the pulleys, and a spring, $f'$, forces one end of the lever $f$ against the side of the pulley, so that this lever will snap into the notch $e'$, thus causing the pulley F' to rotate with the shaft G. But beveled projections or studs $e^2$ $e^2$ are so attached to the frame A or some part of the mechanism that when the chains have been wound up sufficiently the outer end of the lever $f$ will strike this projection $e^2$, and will thus be pressed against the pulley F', but thereby the inner end of the lever is drawn out of the notch $e'$, thereby liberating the pulley. As there is now no force to counteract the force of the spring E' the same presses the knife E downward with sufficient force to cut off the head of the fish, which has just previously been placed between the two arms $b^5$ $b^5$. The head is not entirely cut off, but is torn off as soon as the plate B begins to move upward, which takes place immediately after the fish has been decapitated. The head of the fish drops into a chute, H, suspended from the lower part of the frame A.

The main driving-shaft G of the machine is provided with two long cranks, G' and G², extending in opposite directions, of which cranks G' is connected with the upper end of the section B³ by a connecting-rod, H', whereas the crank G² is connected by a connecting-rod, H², with a frame, J, that slides in the horizontally-recessed tracks A⁴ A⁴, fastened to the frame A above and parallel to the track A', and extending from the front end of the machine to about the middle of the same. The driving-shaft G may have a belt-pulley or may be operated by means of a crank, I, and intermediate gearing, I' and I².

Over the middle of each trough or furrow of the fish-receiving plate B a hook-knife, K, is attached to the outer end of a trough-shaped bar K', which is pivoted to the front edge of the sliding frame J by the pin $g$; whereas the outer end of this bar K' is pivoted to a bar or rod, L, which in turn is pivoted to the outer end of a lever, L', pivoted on a standard, L², on the sliding frame J, and the inner end of this lever L' is pivoted to the slotted inner end of lever M, pivoted on a standard, M', on the sliding frame J.

The outer end of the lever M is provided with a block, $h$, with a stud or pin, $j$, at the end, this block passing through a longitudinal slot, $g'$, at the outer end of a lever, N, which is pivoted to the end of a lever, O, so as to oscillate in the vertical plane, which lever O is pivoted in the sliding frame J in such a manner that it oscillates or swings in the plane of the frame J, this lever N being thus arranged to move in the vertical plane and in the plane of the frame J. The outer end of the lever M is made of spring material, which presses the outer point of this lever against the longitudinally-slotted guides P, for a purpose that will be set forth hereinafter.

The bar K' is made in the shape of an inverted trough, for the purpose of holding the fish, for the two sides of the trough will prevent the fish from dropping on the side.

A scoop-knife, R, is formed of two sharp-edged plates, $r'$ and $r^2$, joined at the lower edges, of which plates the one $r^2$ projects slightly ahead of the other, toward the front of the machine, and has a point at its lower forward end. This scoop-knife is suspended from the lever M by means of two bars or rods, R' R', which are pivoted to a cross-bar, R², of the lever M.

A stirrup, Q, is suspended from a rod, Q', pivoted to the lever M directly behind the cross-bar R², and the ends of the stirrup Q are provided with studs $k$ $k$, which pass through the slots $l$ $l$ parallel to and adjoining the rear end of the scoop-knife R. An arm, $m$, which projects outward from the rear end of the scoop-knife, is attached to each end of the stirrup, and these arms are pivoted to each other at the outer ends, for the ends of the stirrups will be pressed toward each other by the converging sides of the scoop-knife when the stirrup descends.

A knife, S, passing through a slot, $n$, near the outer end of the bar K', is attached to a rod or bar, S', provided with a longitudinally-slotted arm, S², forming an acute angle with the rod itself, and the pin $g$, that pivots the bar K′ to the sliding frame J, passes through the slot $n'$ of the arm S², so that the bar or rod S′ is thus also pivoted to the lower end of the sliding frame J. A connecting-rod, $p$, is pivoted to a projection on the upper edge of the arm S² of the rod or bar S′, and the opposite end of this connecting-rod $p$ is pivoted to a pinion, $o$, engaging with a larger geared wheel, $q$, mounted on the shaft $s$ of the pinion $t$, which engages with the teeth of a rack, A⁵, fastened to the side of the frame A below and slightly toward the inside of the track A⁴. The pinion $o$ is mounted on a shaft, $m^4$, and the reciprocating knife-connecting rod corresponding to the other trough or furrow of the plate B is pivoted to a crank at the corresponding end of this shaft $m^4$, for the purpose of reducing the amount of machinery on the sliding frame J as much as possible.

Two grooved pulleys, T T, are mounted on the shaft $s$, and belts $s'$ pass over a pulley, $t^3$, on the under side of the frame J, and over the grooved pulleys $t'$ on an arm of the side $r^2$ of the scoop-knife R, and over a grooved pulley, $t^2$, near the front end of the side $r^2$. A small circular saw, $n^3$, is mounted on the shaft of the pulley $t^2$ on the inner side of the side piece, $r^2$, of the scoop-knife R, which saw is rotated with great rapidity from the pulley T by means of the driving-belt $s'$.

The shaft $s$ of the sliding frame J is provided with two pinions, $h^2\ h^2$, located about above the center of each furrow of the fish-receiving plate B, and above the forward part of the scoop-knives R R. Racks $w\ w$ pass through a slot in the frame J at right angles to the same, and engage with the pinions $h^2\ h^2$, so that these racks are raised when the sliding frame J moves upward and are lowered when the frame J moves downward. The upper end of each rack $w$ is provided with a spring, $w'$, the end of which is opposite the edge of a drop-knife, U, sliding in a longitudinal groove in the edge of the rack $w$. This drop-knife is provided with a notch, $u$, near the upper end, in the edge opposite the end of the spring $w'$, which is pressed into this notch by striking against the edge of the slot in the top plate of the frame J when the rack is drawn downward. A powerful bow-spring, V, passes through an eye, $v$, at the upper end of the knife U, and this spring V has the tendency to force the knife U downward. This knife U is provided with an aperture or recess, $v'$, at about the middle of its length, and a stud, $x$, at the front end of the lever O, which is forced against the knife U by the spring end of the lever M, catches in this aperture or recess, and can thus hold the knife in the raised position, as it prevents the spring V from forcing it downward.

The guides P are formed of a number of bars, $y$, placed a short distance from each other, to form a slot or groove between each bar. They increase in length from the bottom of the front edge toward the top of the same, so that the front edge of the guide-frame is inclined from the bottom to the top bar, as shown in Fig. 1. A transverse bar, Z, is attached to the outer side of the bars $y$ in such a manner that it passes over the middle of each bar $y$.

Two curved bars, W, curved downward and to the front, are attached to the longitudinal bars C³, and have each a hook, $z$, pivoted in the forward end in such a manner that the hook can swing into a vertical position, but no farther outward, and can be swung back to lie up against the bar W. The bars W W must be of such length that their front ends reach into the rear ends of the scoop-knives R R.

A plate or frame, X, slides in the upper horizontal part of the track A², and has two double hooks, $y'\ y'$, attached to its front end. This plate X is connected with the sliding frame J by a pivoted connecting-rod, H³. A chute, W′, inclined toward the rear of the machine, is arranged below the sliding plate or frame X, a chute, Y, inclined toward the side of the machine, is arranged under the ends of the curved bars W, and an inclined frame, Y′, extends from the chute Y to the chute H. The longitudinal top bars, C³, of the frame are provided with grooves, in which the bearings of the shaft G and crank I are arranged to slide, so that they can be moved toward the front of the machine when the same is not in use, and will then occupy less space. When not in use the removable front-end and rear-end transverse bars G⁴ are inserted.

The machine is shown and described as having the front part inclined, and this construction is preferred; but the entire machine may be horizontal, if desired. The machine is shown as arranged for two fishes, and like cutting and operating devices are above each longitudinal trough or furrow, unless otherwise stated; but the machine may be arranged for only one fish, if desired; but it is preferred to arrange it for two.

The operation is as follows, (it will be described for one fish, as it is the same for one or two fishes:) The fish-receiving plate B being in the position shown in Fig. 1, the fish C is placed upon the same, belly upward, and the head passed in between the converging curved arms $b^5$, which catch on the gill-bones of the fish and prevent more than the head of the fish from passing through between these arms $b^5$; but if the fish-receiving plate B is in the position shown, the spring-clamps D have been separated by the devices described, and as the arms $b^5$ are larger than the heart-plate $c^5$, and this, in turn, larger than the beveled prongs $d\ d$, it follows that the clamps D will be separated the greatest distance at the upper end of the section B³, and this distance decreases regularly toward the lower end of the section B′ in the same proportion as the thickness of a fish decreases toward the tail. The studs $b'\ b'$ are forced into the fish and hold it in place. If the fish-receiving plate is in the position shown, the chain F has been wound upon the pulley F′ and the knife E has been raised to the upper end of the track A³. As soon as the shaft G is rotated further the outer end of the lever $f$ will strike the beveled stud $e^2$, and the pulley will be disengaged from the shaft G; and as there is no resistance to the power of the spring E', the same forces the knife E down the inclined track A³, and it cuts off the fish's head. As the knife has a recess, $d^3$, in the cutting-edge, it does not cut off the head completely, but as soon as the shaft is further rotated the front end of the section B³ begins to slide up the track A', and thus tears the body from the head, which drops into the chute H. As there is some flesh on the back of the head of the fish, the head is not cut off, as this flesh would thus be lost; but if the head is cut off partially and held by the two prongs at the front end of the knife E, and the front end of section B³ moves upward, this piece of flesh will be torn from the head of the fish. As the fish-receiving plate B moves upward in the tracks A' and A², being guided by the pins $a^3$ and $b^3$, the sections begin to straighten out and the lever $f$ has caught in the notch $e'$ of the pulley F', which is thus again engaged with the shaft and winds up the chain F. The bar K' and the hook-knife K are of such weight that the knife K will catch on the belly of the fish and will rip the same open, being assisted by the reciprocating knife S, for as the fish-receiving plate B moves upward the sliding frame J moves downward, and thus causes the pinions $h^2$ and shaft $s$ to be rotated by the action of the teeth of the rack A⁵ on the teeth of the pinion $t$. The weight of the bar K' draws the knife K down, and when a fish passes under the knife it will raise the same more or less, according to the thickness of the fish. Thus the knife adjusts itself automatically, descending a greater or less distance, according to the thickness of the fish. As the scoop-knife R is suspended from a lever, M, the inner end of which is pivoted to that of the lever L', this scoop-knife will be adjusted accordingly by the adjustment of the knife K. As the fish passes upward and the frame J downward the scoop-knife R will plow into the fish and cut out the entrails and the backbone, the latter being cut by the circular saw $n^3$, which is rotated by the belt $s'$ from the pulley T on the shaft $s$. The drop-knife U has been raised by the rack $w$ during the upward movement of the frame J in a manner that will be set forth hereinafter, and is held in a raised position by the stud $x$ at the end of the lever O, which is pivoted flat on the frame J, and this drop-knife must be released at the proper time to cut off the backbone at about half its length. As has been stated, the knife K adjusts itself in position according to the thickness of the fish, and, as has been stated, this adjustment also regulates the position of the lever M, the end of which will thus be in a higher or lower position, and as the frame J begins to descend the stud $j$ in the block $h$ at the extreme end of the lever M will enter one of the slots formed by the bars $y$ of the guides P.

If the fish C is very thick, the knife K will be raised, and so will the end of the lever M, and the stud $j$ at the end of this lever will enter one of the higher—that is, longer—slots of the guide P, and accordingly, if the fish is not thick, the stud $j$ will enter into one of the short slots of the guide P; and it is thus shown that, according to the thickness of the fish, the stud $j$ will enter a slot of corresponding length in the guide P. As stated, there is a transverse bar, Z, on the outer side of the guide P, which bar Z crosses each slot in the middle. If the stud $j$ passes down one of the slots in the guide P and reaches the middle of this slot, the stud $j$ will strike the bar Z, which is beveled, and the outer end of the lever M will be forced inward, and as the outer end of the lever N is connected therewith, this lever N will also be forced inward and the outer end of the lever O will be forced outward, whereby the stud $x$ is drawn out of the aperture $v'$ in the drop-knife U, which is forced downward by the spring V and cuts through the backbone of the fish. The knife U is prevented from dropping too far by a stud, $x^2$, which catches on the angular arm $z^2$, that is attached to the scoop-knife R, and ascends and descends with this scoop-knife; consequently if a large fish is in the plate B the arm $z^2$ will be raised higher and will arrest the downward movement of the knife sooner than if a small fish had been placed upon the plate B. As has been stated, this bone must be cut off about in the middle of the fish, and as the thickness of the fish regulates the length of the slot into which the pin $j$ passes, and as the knife drops when the middle of the corresponding slot is reached, it is plain that the bone will always be cut at or near the middle. The bone having been cut, the drop-knife rips the fish open to the tail and the liver is caught and held by the arms $m$ of the stirrup Q. As the frame J has moved downward the plate X has been drawn forward, and when the fish-receiving plate B begins its return movement the hooks $y'$ $y'$ of the plate X have passed over the upper edge of the section B³ and have caught in the body of the fish, and the hook $z$ has passed into the rear end of the scoop-knife R and has caught in the liver held by the arms $m$. As soon as the fish-receiving plate B begins to descend the plate X moves toward the rear end of the machine and draws the body of the fish from between the spring-clamps D D upon the inclined chute W', down which it slides into some suitable receptacle, and the liver is drawn from the arms $m$ $m$ and drops into a chute, Y, down which it slides onto some suitable receptacle. By the descending movement of the frame J the rack $w$ has been moved downward; but as soon as the frame J begins to move upward the rack $w$ begins to rise. The spring $w'$ at the upper end of the same having been pressed into the notch $u$ of the knife U by the edge of the slot in the top plate of the frame J, it raises the knife with it. As soon as the aperture or recess $v'$ rises up to the stud $x$ at the end of the lever O, this stud $x$ passes into this aperture or recess and locks the knife U in the raised position, from which it is released in the manner described heretofore. After the fish and the liver have been taken from the fish-receiving plate B and the scoop-knife R, the plate B descends and doubles up to assume the position shown in Fig. 1, and the next fish forces the entrails out of the scoop-knife R, and they slide down the apron Y' into the chute H. The decapitating-knife E having been drawn upward, and the plate B in the position shown in Fig. 1, a fresh fish is placed between the clamps, and the above-described operation repeats itself.

Having thus described my invention, I claim as new and desire to secure by Letters Patent—

1. In a fish-dressing machine, the combination of a sliding reciprocating plate for receiving the fish to be dressed with a frame provided with a series of knives, which frame slides above and in the opposite direction to the receiving-plate, and during these movements the knives of the upper sliding plate or frame rip open the belly of the fish and cut out the entrails and backbone, all as set forth.

2. In a machine for dressing fish, the combination, with a reciprocating plate for receiving the fish to be dressed, of a reciprocating frame provided with a series of knives, this plate sliding above the fish-receiving plate and in the opposite direction, and of a sliding spring-knife for decapitating the fish, substantially as herein shown and described, and for the purpose set forth.

3. In a machine for dressing fish, the combination, with a reciprocating plate for receiving the fish to be dressed, of a reciprocating frame provided with a series of knives, this frame sliding above and in opposite direction to the fish-receiving plate, of a sliding spring-knife for decapitating the fish, and of a sliding plate with hooks for drawing the fish from the receiving-plate when the operation is completed, substantially as herein shown and described, and for the purpose set forth.

4. In a machine for dressing fish, the combination, with the fish-receiving plate B, of the reciprocating knife-frame J, the sliding hook-plate X, the shaft G, provided with the opposite cranks, G' and G$^2$, and of the pivoted connecting-rods H', H$^2$, and H$^3$, substantially as herein shown and described, and for the purpose of operating all the parts at the same time from the shaft G, as set forth.

5. In a machine for dressing fish, the combination of the fish-receiving plate, constructed substantially as herein shown and described, with the tracks A' A$^2$ and the three hinged troughed sections, B', B$^2$, and B$^3$, provided with studs $a'$ $a^3$ $b^3$, passing into the longitudinally-grooved tracks A' and A$^2$, as set forth.

6. In a machine for dressing fish, the combination, with the section B', of the clamps D, the springs $a^2$, the studs $c'$ $c'$, the flanged stud $d'$, and of the swinging fork $c^4$, provided with outwardly-beveled prongs $d$, substantially as herein shown and described, and whereby the upper ends of the clamps D D are separated to receive the fish, as set forth.

7. In a machine for dressing fish, the combination, with the section B$^2$, of the clamps D, the springs $a^2$, the studs $c^2$, passing through slots $a^5$, the flanged stud $d^2$, and of the longitudinally-slotted heart-plate $c^5$, pivoted to the lower edge of section B$^3$, substantially as herein shown and described, and for the purpose set forth.

8. In a machine for dressing fish, the combination, with the section B$^3$, of the clamps D, the springs $a^2$, the studs $c^3$, passing through slots $a^6$, and of the converging curved arms $b^5$, pivoted to a cross-bar, D$^3$, of the machine, substantially as herein shown and described, and for the purpose set forth.

9. In a machine for dressing fish, the combination, with the plate B, having troughs or furrows, of the pivoted trough-shaped bar K', carrying the hook-shaped knives, and serving also to assist in holding the fish, as described.

10. In a machine for dressing fish, the combination, with the knife E, the spring E', the chain F, the loose pulley F', provided with a notch, $e'$, of the spring-lever $f$, pivoted in the shaft G, and of the beveled stud $c^2$ on the frame of the machine, substantially as herein shown and described, for the purpose of automatically releasing the knife.

11. In a machine for dressing fish, the combination, with the reciprocating frame J, sliding in tracks A$^4$ above the fish-receiving plate B, of the hook-knife K, fastened to an arm, K', pivoted to the lower edge of the sliding frame J, substantially as herein shown and described, and for the purpose set forth.

12. In a machine for dressing fish, the combination, with a sliding frame, of a hook-knife attached to the end of a bar pivoted to the lower edge of this frame, and of a reciprocating knife fitting in a slot in the forward end of the bar to which the hook-knife is attached, substantially as herein shown and described, and for the purpose set forth.

13. In a machine for dressing fish, the combination, with the sliding frame J, of the hook-knife K, the bar K', pivoted to the plate J, the reciprocating knife S, the bar S', the longitudinally-slotted arm S$^2$, the pin $g$, the connecting-rod $p$, and the revolving shaft $m^4$, substantially as herein shown and described, and for the purpose set forth.

14. In a machine for dressing fish, the combination, with the scoop-knife R, of the circular saw $n^3$, pivoted in the plate $r^2$, near the point of the lower edge, substantially as herein shown and described, and for the purpose set forth.

15. In a machine for dressing fish, the combination, with the scoop-knife R, of the circular saw $n^3$, the pulleys $t'$, $t^2$, $t^3$, and T, and the belt $s'$, substantially as herein shown and described, and for the purpose set forth.

16. In a machine for dressing fish, the combination, with the scoop-knife R, provided with slots $l$, parallel to the rear edge, of the stirrup Q, the studs $k$, and the pivoted arms $m$, attached to the ends of the stirrup Q, substantially as herein shown and described, and for the purpose set forth.

17. In a machine for dressing fish, the combination, with the plate J, the standards M' L², and pivoted hook-knife bar K', of the rod L, the lever L', the lever M, pivoted to the inner end of the lever L', the rod R', and of the scoop-knife R, substantially as herein shown and described, and for the purpose of automatically adjusting the position of both knives K and R by the thickness of the fish, as set forth.

18. In a machine for dressing fish, the combination, with the plate J, the standards M' L², and pivoted hook-knife bar K', of the rod L, the lever L', the lever M, the rod R', the scoop-knife R, the rod Q', and the stirrup Q, provided with the pivoted arms $m$, substantially as herein shown and described, and for the purpose of adjusting the scoop-knife R and the stirrup Q according to the thickness of the fish, so that the liver will be held by the arms $m\ m$, as set forth.

19. In a machine for dressing fish, the combination, with the stirrup having arms $m$, the sliding frame J, and the scoop-knife R, of the hook $z$, pivoted in the ends of the curved bar W, substantially as herein shown and described, and for the purpose of drawing the liver out of the scoop-knife and dropping it into the chute Y, as set forth.

20. In a machine for dressing fish, the combination, with the levers N O and the guide-plate P, constructed substantially as herein shown and described, of a series of strips or bars, $y\ y$, arranged longitudinally and parallel to each other, to form slots between each other, and provided with a beveled diagonal transverse bar, Z, on the outer side, in combination with the lever having at one end the stud $j$, as and for the purpose set forth.

21. In a machine for dressing fish, the combination, with the standards L² M', the plates J P, and the pivoted hook-knife bar K', of the rod L, the lever L', the lever M, having a pin, $j$, attached to the outer end of the levers N and O, substantially as herein shown and described, and for the purpose of automatically adjusting a drop-knife to cut the backbone of the fish at half its length, according to the thickness of the fish.

22. In a machine for dressing fish, the combination, with the sliding frame J and the shaft $s$, of the pinion $h^2$, the rack $w$, the spring $w'$, and of the drop-knife U, having a notch, $u$, substantially as herein shown and described, and for the purpose of raising the drop-knife U by the movement of the frame J, as set forth.

23. In a machine for dressing fish, the combination, with a longitudinally-slotted guide-plate having a transverse piece in the center, of a lever having a stud fitting into the guide-slots at the end and pivoted to move up and down, a lever to move up and down, and a lever to move sidewise, a drop-knife with a notch or aperture, and a spring for forcing the knife downward, as and for the purpose specified.

24. In a machine for dressing fish, the combination, with the scoop-knife R, the frame J, and the drop-knife U, having a stud, $x^2$, of the angular guide-arm $z^2$, attached to the scoop-knife R, substantially as herein shown and described, and for the purpose of regulating the depth to which the drop-knife U cuts, as set forth.

MAGNUS J. PALSON.

Witnesses:
OSCAR F. GUNZ,
C. SEDGWICK.